United States Patent Office 2,834,747
Patented May 13, 1958

2,834,747
CO-POLYMERS FROM ARYL-SUBSTITUTED BUTENYL ALCOHOLS, ETHERS, AND ESTERS AND A CONJUGATED DIENE, COMPOSITIONS CONTAINING SAME, AND METHOD OF MAKING

James N. Short, Borger, Carl A. Uraneck, Phillips, and Alvin C. Rothlisberger, Borger, Tex., assignors to Phillips Petroleum Company, a corporation of Delaware No Drawing. Application November 23, 1953
Serial No. 393,924

19 Claims. (Cl. 260—41.5)

This invention relates to a new class of materials suitable for use in the production of homopolymers of these materials as well as copolymers using monomers copolymerizable therewith. In a further aspect, this invention relates to homopolymers of aryl-substituted butenyl alcohols, ethers, and esters. In a further aspect, this invention relates to copolymers of these alcohols, ethers, and esters with comonomers polymerizable therewith. In a further aspect this invention relates to new polymeric materials, these materials ranging from liquids to elastomers to hard resins.

Each of the following objects is obtained by at least one of the aspects of this invention.

An object of this invention is to provide polymers prepared using a new class of polymerizable materials. A further object of this invention is to prepare polymers from aryl-substituted butenyl alcohols, ethers and esters. A further object of this invention is to provide polymeric materials prepared from aryl-substituted butenyl alcohols, ethers, and esters and materials copolymerizable therewith. A further object of this invention is to provide a variety of polymeric products ranging from liquids to elastomers to resins. A further object of this invention is to provide rubbery materials having excellent green tensile properties. A further object of this invention is to provide binders for solid materials.

Other objects and advantages of this invention will be apparent to one skilled in the art upon reading the accompanying disclosure.

We have found a new class of materials which are valuable for the production of new polymeric materials, this term including copolymers as well as homopolymers. The monomeric materials from which these new polymers are prepared can be represented by the formula

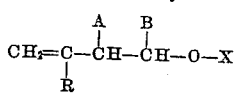

where R is an aryl radical, A and B can be H or a methyl or ethyl radical, and X is —H, —R′, or

where R′ is an aromatic radical or a saturated aliphatic radical. In this structural formula R and R′ may be substituted or unsubstituted. Substituents on these radicals can be halogen, such as fluorine, chlorine, bromine, and iodine, hydroxy, cyano, keto, carboxy, alkyl, aryl, aralkyl, alkoxy, aryloxy, amino and substituted amino groups, the only limitation upon these groups being that they not be so large or numerous as to cause steric hindrance which interferes with the polymerization. Generally R should contain not more than 12 carbon atoms and the number of carbon atoms in X should not exceed 18. A further group of monomers applicable for use in the present invention includes compounds having the structural formula set forth above where X is

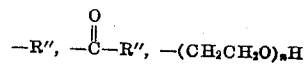

or

where R″ is an unsaturated aliphatic or substituted unsaturated aliphatic radical and $n$ is an integer from 1 to 16. Similarly to R′, R″ may be substituted with the groups set forth above, keeping in mind that steric hindrance should be avoided.

Representative monomers coming within the above identification include 2-(4-chlorophenyl)-4-acetoxy-1-butene, 2-(2,4-dimethylphenyl)-4-acetoxy-1-butene, 2-(4-methoxyphenyl)-4-monochloroacetoxy-1-butene, 2-(2-bromo-4-methylphenyl)-4-hydroxy-1-butene, 2-(1-naphthyl)-4-acetoxy-1-butene, 2-(2-methoxyphenyl)-4-hydroxy-1-butene, 2-phenyl-4-capryloxy-1-butene, 2-phenyl-4-propionoxy-1-butene, 2-(3-methylphenyl)-4-valeroxy-1-butene, 2-(2,4,6-trimethylphenyl)-4-hydroxy-1-butene, 2-(2-methyl-4,6-diethylphenyl)-4-acetoxy-1-butene, 2-[2-(4-methyl)naphthyl]-4-acetoxy-1-butene, 2-phenyl-4-methoxy-1-butene, 2-phenyl-4-monochloropropoxy-1-butene, 2-phenyl-4-isobutoxy-1-butene, 2-phenyl-4-n-nonyloxy-1-butene, 2-phenyl-3-methyl-4-ethyl-5,8,11-trioxa, 2-hydroxy-1-tridecene, 2-phenyl-4-benzoxy-1-butene, 2-phenyl-4-(3-methoxybenzoxy)-1-butene, 2-phenyl-4-(2-aminoethoxy)-1-butene, 2-phenyl-4-(2-hydroxythoxy)-1-butene, 2-phenyl-4-lauryloxy-1-butene, 2-phenyl-4-stearyloxy-1-butene, 2-phenyl-4-acryloxy-1-butene, 2-phenyl-4-crotonoxy-1-butene, 2-phenyl-4-(2-cyanoethoxy)-1-butene, 2-phenyl-4-(2-ketobutoxy)-1-butene, 2-phenyl-4-(3-carboxypropoxy)-1-butene, 2-phenyl-3-(acetoxymethyl)-1-pentene, 2-phenyl-3-methyl-4-carpyloxy-1-pentene, 2-phenyl-4-(N,N-dimethylaminoacetoxy)-1-butene, 2-(3-fluorophenyl)-4-(N,N-diethylaminoacetoxy)-1-butene, 2-(2-iodophenyl)-4-(n-methyl-N-propylaminoacetoxy)-1-butene, 2-(4-N,N-dimethylaminophenyl)-4-hydroxy-1-hexene, 2-phenyl-3-methyl-4-(2-N,N-di-tert-butylaminoethoxy)-1-butene, and 2-phenyl-5-oxa-8,11,14-azo-16-amino-1-hexadecene. The preferred species of these materials are 2-phenyl-4-acetoxy-1-butene, 2-phenyl-4-hydroxy-1-butene. A method which can be employed for the production of many of these monomers is that described by Price, Benton, and Schmidle, J. Am. Chem. Soc. 71, 2860 (1949). For example, alpha-methylstyrene is reacted with paraformaldehyde in the presence of acetic acid and then with acetic anhydride to give 2-phenyl-4-acetoxy-1-butene. Hydrolysis of this ester yields the hydroxy compound, i. e., 2-phenyl-4-hydroxy-1-butene. Ethers and the higher esters can be prepared by reacting the hydroxy compound with the desired alcohol, or acid, to give additional compounds such as those described above. Saturated and unsaturated aliphatic monocarboxylic acids, and monocarboxylic aromatic acids can be used. Acid anhydrides can be substituted for the acids.

Another method in which the esters can be prepared comprises the use of an acid chloride and a hydrogen chloride acceptor. For example, the caprylate can be prepared by reacting caprylyl chloride with 2-phenyl-4-hydroxy-1-butene dissolved in pyridine, as well as by direct esterification with caprylic acid. Finally, ester interchange can be used for their production.

These monomeric materials can be polymerized alone or with other copolymerizable compounds, i. e., compounds containing an active vinylidene group, i. e., $CH_2=C<$. Representative copolymerizable compounds include conjugated dienes such as 1,3-butadiene, isoprene, chloroprene, 2,3-dimethyl-1,3-butadiene, 1,3-pentadiene, and those dienes capable of coreacting sufficiently to give significant monomer reactive ratios as defined by Mayo and Walling, Chem. Rev. 46, 196 (1950); and monoolefins which are copolymerizable with alpha-methylstyrene such as nuclear derivatives of alpha-methylstyrene, isobutylene, styrene, maleic anhydride, unsaturated ethers or esters, vinylidene chloride, acrylonitrile, methyl vinyl ketone, acrylic esters, methacrylic esters, and other mono-olefins capable of coreacting sufficiently to give significant monomer reactivity ratios. Vinylpyridines, such as 2-methyl-5-vinylpyridine are also applicable.

In the preparation of these polymers, the amount of aryl-substituted buetenyl alcohol, ether, or ester can be varied from 0.1 to 100 parts of the monomeric material. Generally at least 1 part of the aryl-substituted butenyl alcohol or its derivative is employed per hundred parts of the monomeric material, it being understood that mixtures of different aryl-substituted butenyl alcohols or their derivatives can be employed as well as mixtures of these compounds with various other monomeric materials.

A particularly valuable group of materials which can be prepared according to this invention are those in which a copolymer is prepared using 2-phenyl-4-hydroxy-1-butene and the esters thereof and a conjugated diene such as those mentioned above. When copolymerized using from 0.5 to 99.5, preferably from 15 to 60 parts of the alcohol per hundred parts of monomers, the resulting polymers are rubbery in nature. The copolymers of the alcohols described above have unexpectedly high green tensile values, the green tensile being the tensile of the material after all of the rubber compounding ingredients have been added, but before the composition has been cured. Rubber having good green tensile properties is necessary where considerable working takes place before the rubber is cured. An example of such an application is the coating of wire with a rubbery material. In such an instance the wire is coated with considerable speed and the coating is subjected to large stresses. If a rubber without good green tensile strength is used thin spots will appear in the insulation. The manufacture of gaskets is another field in which the rubbery material is subjected to stress before curing.

Furthermore, rubber with good green tensile properties will produce a better ultimate product for all applications, although it is not so important in many of these, because the carbon black and other ingredients used in rubber processing have a marked ability in increasing the tensile properties of the rubber following cure. They can be reinforced with various pigments or dyes.

The materials of this invention are also useful as casting resins, potting compounds, and as binders for solid materials. Homopolymers of the aryl-substituted butenyl alcohols are particularly valuable as plastics coating resins, coating compositions and the like. Filaments having valuable properties can be formed from the polymers of this invention.

The monomeric materials herein described can undergo additional polymerization by any of the methods known to the art such as mass or emulsion polymerization, although emulsion polymerization is to be preferred. Furthermore, they can undergo polymerization by a free radical mechanism, such as occurs in thermal or photopolymerization, or polymerization initiated by peroxides, persulfates, hydroperoxides, azo compounds, and the like, or by ionic mechanism such as occurs in acid- or base-catalyzed polymerization initiated by sulfuric acid, boron trifluoride, aluminum chloride, sodium, sodium amide, sodium alkyls, etc.

Depending upon the type of polymerization employed and the recipe used, the temperature of polymerization can vary over a very broad range. For emulsion polymerization, the temperature is generally in the range between —40 and 70° C. When Friedel-Crafts type catalysts are employed, the polymerization temperature is sometimes as low as —100° C. or even lower. In instances where catalysts of the alkali metal type are chosen, temperatures in the range between 20 and 110° C. can be employed.

Rubbery materials having excellent properties are readily prepared by the copolymerization of conjugated dienes with the monomers of this invention. For example, the copolymers of 2-phenyl-4-hydroxy-1-butene with 1,3-butadiene possess improved green strength, i. e., the compounded but uncured rubbers have exceptionally high tensile strength. When the rubbers are evaluated as tread stocks for tires, they show a good balance of properties and both unaged and aged samples show superiority in abrasion resistance to butadiene/α-methylstyrene and butadiene/styrene rubbers prepared at 41° F., and also to natural rubber. These rubbers also show superiority in low temperature properties. They are well suited for carcass stock applications, particularly the butadiene/2-phenyl-4-hydroxy-1-butene copolymer which has improved hot tensile strength. When compounded in a silica recipe, the butadiene/2-phenyl-4-acetoxy-1-butene copolymer possessed unusually high hot tensile strength in comparison to butadiene/styrene and natural rubbers. Copolymers of these alcohols are easily processable.

Example I

Copolymers of butadiene with 2-phenyl-4-acetoxy-1-butene and 2-phenyl-4-hydroxy-1-butene were prepared by emulsion polymerization at 41° F. in accordance with the following recipes:

|  | Parts by Weight | |
| --- | --- | --- |
| Butadiene | 75 | 75 |
| 2-Phenyl-4-acetoxy-1-butene | 25 | |
| 2-Phenyl-4-hydroxy-1-butene | | 25 |
| Water | 180 | 180 |
| K-SRD soap [1] | 5.0 | 5.0 |
| Daxad 11 [2] | 0.20 | 0.20 |
| KCl | 0.50 | 0.50 |
| tert-$C_{12}$ mercaptan | 0.20 | 0.15 |
| Cumene hydroperoxide | 0.125 | |
| tert-Butylisopropylbenzene hydroperoxide | | 0.132 |
| $K_4P_2O_7$ | 0.22 | 0.165 |
| $FeSO_4.7H_2O$ | 0.20 | 0.139 |

[1] Potassium Synthetic Rubber Division soap.
[2] Sodium salt of condensed alkyl aryl sulfonic acid.

Two runs were made for the preparation of 75/25 butadiene/α-methylstyrene copolymers at 41° F. in accordance with the following recipe:

| | Parts by weight |
|---|---|
| Butadiene | 75 |
| α-Methylstyrene | 25 |
| Water | 215 |
| Dresinate 214 [1] | 4.0 |
| Triton R-100 [2] | 0.15 |
| $Na_3PO_4 \cdot 12H_2O$ | 0.5 |
| Tert-$C_{12}$ mercaptan | 0.17 |
| Cumene hydroperoxide | 0.125 |
| $K_4P_2O_7$ | 0.22 |
| $FeSO_4 \cdot 7H_2O$ | 0.20 |

[1] Rosin soap, K salt.
[2] Neutral sodium salt of a condensed aryl sulfonic acid.

Results of the four runs were as follows:

| Copolymer | Conversion | | Mooney Value, ML-4 |
|---|---|---|---|
| | Time, Hours | Percent | |
| Butadiene/2-phenyl-4-acetoxy-1-butene | 14.8 | 66 | 59 |
| Butadiene/2-phenyl-4-hydroxy-1-butene | 19.9 | 62 | 71 |
| Butadiene/α-methylstyrene | 15.7 | 72 | 75 |
| Butadiene/α-methylstyrene | 13.4 | 62 | 65 |

The four elastomers prepared as described above were evaluated in a tread formulation together with a sample of a 41° F. 75/25 butadiene/styrene elastomer and also with natural rubber. The following basic recipes were employed:

| | Parts by Weight | |
|---|---|---|
| | Synthetic | Natural Rubber |
| Elastomer | 100 | 100 |
| Carbon black (Philblack O) | 50 | 50 |
| Zinc oxide | 3 | 4 |
| Stearic acid | [4] 2 | 3 |
| Sulfur | 1.75 | 2 |
| Flexamine [1] | 1 | 1 |
| Circosol-Paraflux blend [2] | 5 | |
| Santocure [3] | [5] variable | 0.5 |
| Pine tar | | 3 |

[1] A physical mixture containing 65 percent of a complex diarylamine-ketone reaction product and 35 percent of N,N'-diphenyl-p-phenylenediamine.
[2] 50/50 blend of Circosol-2XH and Paraflux Circosol-2XH: a petroleum hydrocarbon softener, containing hydrocarbons of high molecular weight, in the form of a heavy, viscous, transparent, pale green, odorless liquid of low volatility; sp. gr. 0.940; Saybolt Universal viscosity at 100° F., about 2,000 seconds. Paraflux: saturated polymerized hydrocarbon.
[3] N-cyclohexyl-2-benzothiazolesulfenamide.
[4] Except the butadiene/styrene copolymer, 1.0 part stearic acid.
[5] Butadiene/2-phenyl-4-acetoxy-1-butene, 0.8 part; butadiene/2-phenyl-4-hydroxy-1-butene, 0.7 part; butadiene/α-methylstyrene, 0.9 part; butadiene/styrene, 1.0 part.

The stocks were milled, cured 30 minutes at 307° F. and physical properties determined. The results were as follows:

| Elastomer | Conversion, percent | 80° F. | | | 200° F. Tensile, p.s.i. | ΔT ° F. | Resilience, percent | Flex Life, M[1] | Shore Hardness | Abrasion Loss, g. | Comp. Set, 2 Hrs. at 212° F. | Freeze Point | | Raw ML-4 | Compounded MS 1½ at 212° F. |
|---|---|---|---|---|---|---|---|---|---|---|---|---|---|---|---|
| | | 300% Modulus, p.s.i. | Tensile, p.s.i. | Elongation, percent | | | | | | | | Gehman, ° C. | T-R, ° C. | | |
| Butadiene/2-phenyl-4-acetoxy-1-butene | 66 | 1,415 | 3,300 | 530 | 1,520 | 67.9 | 65.1 | 11.2 | 54 | 4.80 | 18.9 | −71 | −63 | 59 | 44 |
| Butadiene/2-phenyl-4-hydroxy-1-butene | 62 | 1,490 | 3,440 | 490 | 1,580 | 65.5 | 65.9 | 16.3 | 54.5 | 3.48 | 15.3 | −64 | −58 | 71 | 56.5 |
| Butadiene/α-methylstyrene | 72 | 1,690 | 3,820 | 510 | 1,800 | 64.2 | 67.0 | 29.1 | 57.5 | 5.89 | 17.0 | −56 | −51 | 75 | 53 |
| Butadiene/α-methylstyrene | 62 | 1,550 | 3,900 | 540 | 1,820 | 67.2 | 67.2 | 35.5 | 57 | 6.26 | 17.0 | −59 | −53 | 65 | 49 |
| Butadiene/styrene | | 1,480 | 3,450 | 535 | 1,830 | 67.6 | 63.1 | 17.2 | 53.5 | 5.48 | 18.6 | −55 | −47 | 48 | 38 |
| Natural rubber | | 1,625 | 3,200 | 480 | 2,660 | 47.6 | 69.2 | [2] 8.8% | 58 | 8.96 | 19.0 | −61 | −59 | 90 | 31.5 |

OVEN AGED 24 HOURS AT 212° F.

| Butadiene/2-phenyl-4-acetoxy-1-butene | 66 | 2,775 | 3,060 | 320 | | 60.2 | 69.7 | 7.3 | 63 | 3.57 | | | | | |
| Butadiene/2-phenyl-4-hydroxy-1-butene | 62 | | 3,310 | 280 | | 55.1 | 71.4 | 4.9 | 62.5 | 2.38 | | | | | |
| Butadiene/α-methylstyrene | 72 | 2,870 | 3,125 | 320 | | 54.1 | 70.2 | 17.2 | 62 | 4.14 | | | | | |
| Butadiene/α-methylstyrene | 62 | 2,685 | 3,485 | 370 | | 55.1 | 71.1 | 10.5 | 62 | 4.56 | | | | | |
| Butadiene/styrene | | 2,715 | 3,460 | 370 | | 56.1 | 68.7 | 11.5 | 62 | 3.97 | | | | | |
| Natural rubber | | 1,875 | 2,120 | 325 | | 43.3 | 74.4 | [2] 30.5% | 61.5 | 9.36 | | | | | |

[1] Thousands of flexures to failure.
[2] Percent broken in 50,000 flexures.

These data show that the butadiene/2-phenyl-4-acetoxy-1-butene and butadiene/2-phenyl-4-hydroxy-1-butene copolymers have a good balance of properties and both unaged and aged samples show superiority in abrasion resistance to the other elastomers tested. The new polymers also show superiority in low temperature properties as evidenced by the freezing point.

*Example II*

The elastomers which were evaluated in the tread formulation described in Example I were also evaluated in a carcass formulation. The basic recipes are shown below.

These data show that the butadiene/2-phenyl-4-acetoxy-1-butene and butadiene/2-phenyl-4-hydroxy-1-butene copolymers have a good balance of properties and that the butadiene/2-phenyl-4-hydroxy-1-butene copolymer has greater tensile strength in both unaged and aged samples than the other synthetic elastomers tested. It also has superior tack to the other synthetic elastomers.

*Example III*

Two butadiene/2-phenyl-4-acetoxy-1-butene and two butadiene/α-methylstyrene copolymers were prepared by

|  | Parts by Weight | | | | |
| --- | --- | --- | --- | --- | --- |
|  | Butadiene/ 2-phenyl-4-acetoxy-1-butene | Butadiene/ 2-phenyl-4-hydroxy-1-butene | Butadiene/ α-methyl-styrene | Butadiene/ Styrene | Natural Rubber |
| Elastomer | 100 | 100 | 100 | 100 | 100 |
| Carbon black (Philblack O) | 25 | 25 | 25 | 25 | 25 |
| Zinc oxide | 3 | 3 | 3 | 3 | 5 |
| Sulfur | 2.5 | 2.5 | 2.5 | 2.5 | 2.75 |
| Stearic acid | 1.0 | 1.0 | 1.0 | 1.0 | 1.0 |
| Agerite Resin D [1] | 1.0 | 1.0 | 1.0 | 1.0 | 1.0 |
| Paraflux [2] | 5.0 | 5.0 | 5.0 | 5.0 | |
| Staybelite Resin [3] | 2.5 | 2.5 | 2.5 | 2.5 | |
| Santocure [2] | 0.8 | 0.7 | 0.9 | 1.0 | 0.7 |
| A-32 [4] | 0.16 | 0.14 | 0.18 | 0.2 | |
| Pine tar | | | | | 4.0 |

[1] Polymerized trimethyldihydroquinoline.
[2] As in Example I.
[3] Hydrogenated rosin.
[4] Reaction product of butyraldehyde and butylidene aniline.

The stocks were milled, cured 30 minutes at 307° F., and physical properties determined. The following results were obtained:

| Elastomer | Conversion, percent | 80° F. | | | 200° F. Tensile, p.s.i. | ΔT° F. | Resilience, percent | Flex Life, M | Shore Hardness | Compression Set, percent | Meter Tack | Compounded MS 1½ at 212° F. | Raw ML-4 |
| --- | --- | --- | --- | --- | --- | --- | --- | --- | --- | --- | --- | --- | --- |
|  |  | 300% Modulus, p.s.i. | Tensile, p.s.i. | Elongation, percent |  |  |  |  |  |  |  |  |  |
| Butadiene/2-phenyl-4-acetoxy-1-butene | 66 | 900 | 1,700 | 430 | 680 | 31.4 | 78.5 | 1.1 | 47 | 13.3 | <25 | 29.5 | 59 |
| Butadiene/2-phenyl-4-hydroxy-1-butene | 62 | 890 | 3,240 | 570 | 730 | 32.8 | 78.2 | 1.3 | 46 | 11.5 | 150 | 36 | 71 |
| Butadiene/α-methyl-styrene | 72 | 1,040 | 2,100 | 440 | 630 | 33.8 | 77.5 | 2.3 | 49 | 11.2 | <25 | 33 | 75 |
| Butadiene/α-methyl-styrene | 62 | 880 | 2,450 | 500 | 480 | 33.5 | 77.5 | 0.6 | 48.5 | 11.5 | <25 | 31 | 65 |
| Butadiene/styrene |  | 790 | 1,760 | 450 | 480 | 34.8 | 77.3 | 3.5 | 43.5 | 11.6 | <25 | 24 | 48 |
| Natural rubber |  | 610 | 3,200 | 620 | 2,680 | 22.3 | 84.9 | [1]31.3% | 43.5 | 16.4 | 425 | 22.5 | 90 |

OVEN AGED 24 HOURS AT 212° F.

| Elastomer | Conversion | 300% Mod | Tensile | Elongation | 200° F Tensile | ΔT° F | Resilience | Flex Life | Shore |
| --- | --- | --- | --- | --- | --- | --- | --- | --- | --- |
| Butadiene/2-phenyl-4-acetoxy-1-butene | 66 | 1,460 | 1,815 | 330 |  | 30.1 | 80.8 | 0.9 | 53.5 |
| Butadiene/2-phenyl-4-hydroxy-1-butene | 62 |  | 2,200 | 320 |  | 29.1 | 81.1 | 1.0 | 53 |
| Butadiene/α-methyl-styrene | 72 |  | 1,490 | 270 |  | 30.1 | 80.5 | 1.1 | 54 |
| Butadiene/α-methyl-styrene | 62 | 1,535 | 1,960 | 340 |  | 30.8 | 80.8 | 1.0 | 54 |
| Butadiene/styrene |  |  | 940 | 240 |  | 29.4 | 79.8 | 1.7 | 51.5 |
| Natural rubber |  | 1,050 | 2,985 | 520 |  | 19.6 | 86.1 | 26.2 | 48 |

[1] Percent broken in 50,000 flexures.

emulsion polymerization at 41° F. in accordance with the following recipes:

| | Parts by Weight | |
|---|---|---|
| | Recipe A | Recipe B |
| Butadiene | 75 | 75 |
| 2-Phenyl-4-acetoxy-1-butene | 25 | 25 |
| α-Methylstyrene | 25 | |
| Water | 215 | 180 |
| Dresinate 214 [1] | 4.0 | |
| K–SRD soap [2] | | 5.0 |
| Triton R–100 [3] | 0.15 | |
| Daxad 11 [4] | | 0.20 |
| Na₃PO₄·12H₂O | 0.50 | |
| KCl | | 0.50 |
| tert-C₁₂ mercaptan | variable | variable |
| Cumene hydroperoxide | 0.125 | 0.125 |
| K₄P₂O₇ | 0.22 | 0.22 |
| FeSO₄·7H₂O | 0.20 | 0.20 |

[1] Rosin soap, K salt.
[2] Potassium Synthetic Rubber Division soap.
[3] Neutral sodium salt of a condensed aryl sulfonic acid.
[4] Sodium salt of condensed alkyl aryl sulfonic acid.

The following table gives the amount of mercaptan employed in each case and the results of the runs.

| Second Monomer | tert-C₁₂ Mercaptan, Part | Conversion | | Mooney ML-4 |
|---|---|---|---|---|
| | | Time, Hours | Percent | |
| 2-Phenyl-4-acetoxy-1-butene | 0.15 | 14.1 | 57 | 69 |
| 2-Phenyl-4-acetoxy-1-butene | 0.20 | 14.1 | 58 | 52 |
| α-Methylstyrene | 0.15 | 13.7 | 61 | 64 |
| α-Methylstyrene | 0.20 | 13.7 | 60 | 44 |

A blend of approximately equal parts of the two butadiene/2-phenyl-4-acetoxy-1-butene copolymers was prepared. Similarly a 50/50 blend of the two butadiene/α-methylstyrene copolymers was prepared. These blends were evaluated in a silica loaded stock together with the butadiene/styrene copolymer described in Example I and also with natural rubber. The following basic compounding recipes were employed:

| | Parts by Weight | |
|---|---|---|
| | Synthetic | Natural |
| Elastomer | 100 | 100 |
| Silica | 70 | 70 |
| Zinc oxide | 3 | 4 |
| Sulfur | 1.75 | 2 |
| Stearic acid | [1] 2.0 and 1.0 | 3 |
| Flexamine [2] | 1 | 1 |
| Circosol-Paraffux blend [2] | 5 | |
| Santocure [2] | 2 | 1.2 |
| Diphenylguanidine | 0.4 | |
| Pine tar | | 3 |

[1] One part stearic acid for the butadiene/styrene copolymer.
[2] As in Example I.

The stocks were milled, cured 45 minutes at 307° F., and physical properties determined. The following results were obtained:

| | 80° F. | | | 212° F. Tensile |
|---|---|---|---|---|
| | 300% Modulus, p. s. i. | Tensile, p. s. i. | Elongation, percent | |
| Butadiene/2-phenyl-4-acetoxy-1-butene | 2,000 | 3,150 | 470 | 2,070 |
| Butadiene/α-methylstyrene | 2,070 | 2,900 | 410 | 1,180 |
| Butadiene/styrene | 1,590 | 1,950 | 360 | 910 |
| Natural rubber | 870 | 1,910 | 500 | 790 |

These data show the superiority of the butadiene/2-phenyl-4-acetoxy-1-butene copolymers over the other elastomers in both 80° F. and 212° F. tensile strength. These data illustrate an unexpected property of the polymers of this invention, which is that silica exhibits a considerable reinforcing action. In natural rubber, silica acts as a filler with negligible reinforcing properties.

*Example IV*

2-phenyl-4-acetoxy-1-butene was copolymerized with butadiene and isoprene using variable amounts of the monomers. The following 41° F. emulsion polymerization recipe was employed:

| | Parts by weight |
|---|---|
| Diene | Variable |
| Second monomer | Variable |
| Water | 180 |
| K–SRD soap [1] | 5.0 |
| Daxad 11 [1] | 0.20 |
| KCl | 0.50 |
| Tert-C₁₂ mercaptan | 0.20 |
| Tert-butylisopropylbenzene hydroperoxide | 0.104 |
| K₄P₂O₇ | 0.165 |
| FeSO₄·7H₂O | 0.139 |

[1] As in Example I.

The following table gives the ratio of monomers employed in each case and the time-conversion data.

| Monomers | | Conversion, Percent | | |
|---|---|---|---|---|
| Type | Ratio | 3 Hours | 6 Hours | 24 Hours |
| Butadiene/2-phenyl-4-acetoxy-1-butene | 75/25 | 27 | 51 | 86 |
| Butadiene/2-phenyl-4-acetoxy-1-butene | 50/50 | 17 | 27 | 64 |
| Butadiene/2-phenyl-4-acetoxy-1-butene | 25/75 | 10 | 13 | 34 |
| Isoprene/2-phenyl-4-acetoxy-1-butene | 75/25 | 14 | 26 | 74 |
| Isoprene/2-phenyl-4-acetoxy-1-butene | 50/50 | 10 | 19 | 53 |

*Example V*

The following 41° F. emulsion polymerization recipe was employed for the preparation of copolymers of butadiene with 2-phenyl-4-acetoxy-1-butene and 2-phenyl-4-hydroxy-1-butene and terpolymers of these materials with styrene:

| | Parts by weight |
|---|---|
| Monomers | 100 |
| Water | 180 |
| K–SRD soap [1] | 5.0 |
| Daxad 11 [1] | 0.20 |
| KCl | 0.50 |
| Tert-C₁₂ mercaptan | 0.20 |
| Tert-butyliospropylbenzene hydroperoxide | 0.104 |
| K₄P₂O₇ | 0.165 |
| FeSO₄·7H₂O | 0.139 |

[1] As in Example I.

The monomer ratios and results are given below.

| Monomers | | Conversion, Percent | | | | Refractive Index |
|---|---|---|---|---|---|---|
| Type | Ratio | 2.9 Hours | 5.7 Hours | 24 Hours | 70.2 Hours | |
| Butadiene/2-phenyl-4-acetoxy-1-butene | 75/25 | 34 | 56 | 85 | 88 | 1.5236 |
| Butadiene/styrene/2-phenyl-4-acetoxy-1-butene | 75/12.5/12.5 | 45 | 72 | 90 | 93 | 1.5292 |
| Butadiene/styrene/2-phenyl-4-acetoxy-1-butene | 50/25/25 | 35 | 54 | 78 | 81 | 1.5452 |
| Butadiene/2-phenyl-4-hydroxy-1-butene | 75/25 | 10 | 20 | 57 | 76 | 1.5259 |
| Butadiene/styrene/2-phenyl-4-hydroxy-1-butene | 75/12.5/12.5 | 22 | 43 | 78 | 85 | 1.5312 |
| Butadiene/styrene/2-phenyl-4-hydroxy-1-butene | 50/25/25 | 13 | 20 | 54 | 70 | 1.5472 |

*Example VI*

The butadiene/2-phenyl-4-acetoxy-1-butene and butadiene/2-phenyl-4-hydroxy-1-butene elastomers described in Example I were analyzed to determine the amount of combined 2-phenyl-4-acetoxy-1-butene and 2-phenyl-4-hydroxy-1-butene, respectively, in the copolymers. The results were as follows:

| | Weight percent |
|---|---|
| Combined 2-phenyl-4-acetoxy-1-butene in copolymer | 19 |
| Combined 2-phenyl-4-hydroxy-1-butene in copolymer | 15.7 |

*Example VII*

The following recipe was employed for the production of 50/50 butadiene/2-phenyl-4-acetoxy-1-butene copolymers by emulsion polymerization at 41° F. using different oxidants:

| | Parts by weight |
|---|---|
| Butadiene | 50 |
| 2-phenyl-4-acetoxy-1-butene | 50 |
| Water | 180 |
| K–SRD soap [1] | 5 |
| Daxad 11 [1] | 0.20 |
| Tert-$C_{12}$ mercaptan | 0.20 |
| $K_4P_2O_7$ | 0.22 |
| $FeSO_4 \cdot 7H_2O$ | 0.20 |
| KCl | 0.50 |
| Oxidant | Variable |

[1] As in Example I.

The following table gives the oxidant employed in each case and the results obtained:

| Oxidant | | Conversion, Percent | | |
|---|---|---|---|---|
| Type | Parts | 3.2 Hours | 24 Hours | 118 Hours |
| Cumene hydroperoxide | 0.125 | 8.9 | 52.9 | 67.3 |
| tert-Butylisopropyl-benzene hydroperoxide | 0.171 | 19.8 | 66.6 | |
| tert-Dodecylisopropyl-benzene hydroperoxide | 0.263 | 21.9 | 64.8 | |
| tert-Octadecylisopropyl-benzene hydroperoxide | 0.333 | 25.7 | 42.7 | 54.5 |

*Example VIII*

The following run demonstrates the preparation of 2-phenyl-4-acetoxy-1-butene:

A reactor was charged with 9 kg. of α-methylstyrene, 6.5 pounds of paraformaldehyde, and 55 pounds of glacial acetic acid. The mixture was stirred, heated to reflux temperature, and maintained at that temperature (approximately 210–235° F. (99–113° C.)) for three hours. Approximately 27 pounds of unreacted acetic acid was removed by vacuum distillation (about 75–100 mm. Hg), 25 pounds of acetic anhydride was added, and the mixture was stirred and refluxed for three more hours. At the end of this period the unreacted acetic acid, acetic anhydride, and α-methylstyrene were removed by vacuum distillation. The residue was distilled to give 2-phenyl-4-acetoxy-1-butene boiling at 95–102° C. at a pressure of 0.3–0.7 mm. of Hg.

*Example IX*

The following run demonstrates the preparation of 2-phenyl-4-hydroxy-1-butene:

A solution containing 700 grams KOH, 700 cc. water, and 1000 cc. isopropyl alcohol was prepared, cooled, and charged to a reactor provided with a stirrer, reflux condenser, and means for adding the material to be hydrolyzed. Seven moles (1330 grams) of 2-phenyl-4-acetoxy-1-butene was added, with stirring, to the KOH solution. The mixture was then refluxed four hours, cooled, the upper alcohol layer separated and washed twice with two liters of water, and then dried over anhydrous potassium carbonate. Upon distillation the 2-phenyl-4-hydroxy-1-butene was obtained which boiled at 63° C. at a pressure of 0.15 mm. of Hg or 73° C. at a pressure of 0.3 mm. of Hg.

*Example X*

2-phenyl-4-capryloxy-1-butene was synthesized from 2-phenyl-4-hydroxy-1-butene and caprylyl chloride and the product copolymerized at 41° F. with butadiene in accordance with the following recipe:

| | Parts by weight |
|---|---|
| Butadiene | 75 |
| 2-phenyl-4-capryloxy-1-butene | 25 |
| Water | 180 |
| Potassium laurate | 3.0 |
| Potassium myristate | 3.0 |
| Tert-dodecyl mercaptan | 0.20 |
| Tert-butylisopropylbenzene hydroperoxide | 0.171 |
| $FeSO_4 \cdot 7H_2O$ | 0.20 |
| $K_4P_2O_7$ | 0.22 |
| KCl | 0.50 |

A conversion of 79 percent was obtained in 3.7 hours.

*Example XI*

Butadiene was copolymerized with 2-phenyl-4-capryloxy-1-butene using the recipe given in Example X except that a 50/50 monomer ratio was employed. A conversion of 76 percent was obtained in 10.5 hours.

*Example XII*

Butadiene (75 parts) was copolymerized with 2-phenyl-4-monochloroacetoxy-1-butene (25 parts) in accordance with the recipe given in Example X. At 5.25 hours a booster of 0.41 millimole of tert-butylisopropylbenzene hydroperoxide and 0.36 millimole of ferrous pyrophosphate was added. A conversion of 18 percent was obtained in 6.25 hours.

*Example XIII*

Butadiene/styrene, butadiene/alpha-methylstyrene, butadiene/2-phenyl-4-acetoxy-1-butene, and butadiene/2-phenyl-4-hydroxy-1-butene copolymers were prepared by emulsion polymerization at 41° F. in accordance with the following recipes:

|  | Parts by Weight | | | |
|---|---|---|---|---|
| Butadiene | 50 | 50 | 50 | 50 |
| Styrene | 50 | | | |
| alpha-Methylstyrene | | 50 | | |
| 2-phenyl-4-acetoxy-1-butene | | | 50 | |
| 2-phenyl-4-hydroxy-1-butene | | | | 50 |
| Water | 215 | 215 | 180 | 180 |
| Dresinate 214 [1] | 4 | 4 | | |
| Fatty acid soap [2] | | | 5 | |
| Potassium laurate | | | | 3 |
| Potassium myristate | | | | 3 |
| Triton R-100 [3] | 0.15 | 0.15 | | |
| Daxad 11 [4] | | | 0.20 | |
| $Na_3PO_4 \cdot 12H_2O$ | 0.50 | 0.50 | | |
| tert-Dodecyl mercaptan | 0.15 | 0.20 | 0.20 | 0.075 |
| Cumene hydroperoxide, 100% | 0.125 | 0.125 | | |
| tert-Butylisopropylbenzene hydroperoxide | | | 0.171 | 0.171 |
| $K_4P_2O_7$ | 0.22 | 0.22 | 0.22 | 0.22 |
| $FeSO_4 \cdot 7H_2O$ | 0.20 | 0.20 | 0.20 | 0.20 |
| KCl | | | 0.50 | 0.50 |

[1] Rosin soap, potassium salt.
[2] Potassium Synthetic Rubber Division soap.
[3] Neutral sodium salt of a condensed aryl sulfonic acid.
[4] Sodium salt of condensed alkyl aryl sulfonic acid.

| Description | 212 F. Compression Set, percent | 80 F. | | | 200 F. Tensile,[b] p.s.i. | ΔT, F. | Resilience, percent | Flex Life, M | Shore Hardness | Swelled, percent | Extracted, percent | 80 F. Tear Resistance, lb./in. | Freeze Point | | Compounded MS 1½ at 212 F. |
|---|---|---|---|---|---|---|---|---|---|---|---|---|---|---|---|
| | | 300% Modulus,[b] p.s.i. | Tensile,[b] p.s.i. | Elongation,[b] percent | | | | | | | | | T-R, C. | Gehman, C. | |
| Butadiene/styrene | 16.6 | 1,860 | 3,670 | 515 | 2,070 | 67.2 | 58.8 | [a]70% | 62.5 | 146.1 | 6.7 | 345 | −22 | −32 | 36.5 |
| Butadiene/α-methyl-styrene | 14.8 | 2,160 | 3,600 | 490 | 2,230 | 66.2 | 57.6 | [a]87.7% | 66 | 152.0 | 6.9 | 375 | −24 | −31 | 38 |
| Butadiene/2-phenyl-4-acetoxy-1-butene | 18.6 | 1,660 | 3,160 | 530 | 1,850 | 67.2 | 58.7 | 37.3 | 57 | 148.8 | 10.0 | 375 | −35 | −49 | 31 |
| Butadiene/2-phenyl-4-hydroxy-1-butene | 15.0 | 1,950 | 3,560 | 520 | 2,160 | 70.3 | 52.7 | 51.2 | 63 | 73.7 | 10.2 | 335 | −22 | −33 | 36 |

OVEN AGED 24 HOURS AT 212 F.

| Butadiene/styrene | | 2,600 | 3,500 | 395 | | 58.5 | 58.0 | 31.5 | 69 | | | | | | |
| Butadiene/α-methyl-styrene | | 2,800 | 3,620 | 400 | | 60.2 | 57.8 | 17.2 | 71 | | | | | | |
| Butadiene/2-phenyl-4-acetoxy-1-butene | | 2,440 | 3,500 | 430 | | 60.2 | 58.3 | 26.9 | 65 | | | | | | |
| Butadiene/2-phenyl-4-hydroxy-1-butene | | 3,500 | 3,980 | 350 | | 61.5 | 50.1 | 27.9 | 70 | | | | | | |

[a] Percent broken in 50,000 flexures.
[b] Oven aged properties are 45 minute cure.

The reactions were shortstopped with 0.3 percent by weight (0.2 percent for the butadiene/2-phenyl-4-hydroxy-1-butene copolymer), based on the monomers charged, of di-tert-butylhydroquinone and 2 percent by weight of phenyl-beta-naphthylamine, based on the polymer, was added as the antioxidant.

Results from the four runs were as follows:

| Copolymer | Conversion | | Mooney Value, ML-4 |
|---|---|---|---|
| | Time, Hours | Percent | |
| Butadiene/styrene | 10 | 60 | 50 |
| Butadiene/alpha-methylstyrene | 14 | 62 | 46 |
| Butadiene/2-phenyl-4-acetoxy-1-butene | 11.4 | 67 | 40 |
| Butadiene/2-phenyl-4-hydroxy-1-butene | 46.8 | 54.5 | 50 |

The four elastomers were evaluated in a tread formulation using the following recipes:

| | Parts by Weight | | | |
|---|---|---|---|---|
| | Butadiene/styrene | Butadiene/α-methyl-styrene | Butadiene/2-phenyl-4-acetoxy-1-butene | Butadiene/2-phenyl-4-hydroxy-1-butene |
| Elastomer | 100 | 100 | 100 | 100 |
| Carbon Black (Philblack O) | 50 | 50 | 50 | 50 |
| Zinc oxide | 3 | 3 | 3 | 3 |
| Stearic acid | 2 | 2 | 2 | 2 |
| Flexamine [1] | 1 | 1 | 1 | 1 |
| Circosol-Paraflux blend [1] | 5 | 5 | 5 | 5 |
| Sulfur | 1.75 | 1.75 | 1.75 | 1.75 |
| Santocure | 0.95 | 1.25 | 0.80 | 0.70 |

[1] As in Example I.

The stocks were milled, cured 30 minutes at 307° F. and physical properties determined. The results were as follows:

Example XIV

The elastomers described in Example XIII were also evaluated in a carcass formulation. The recipes were as follows:

| | Parts by Weight | | | |
|---|---|---|---|---|
| | Butadiene/styrene | Butadiene/α-methyl-styrene | Butadiene/2-phenyl-4-acetoxy-1-butene | Butadiene/2-phenyl-4-hydroxy-1-butene |
| Elastomer | 100 | 100 | 100 | 100 |
| Carbon black (Philblack O) | 25 | 25 | 25 | 25 |
| Zinc oxide | 3 | 3 | 3 | 3 |
| Stearic acid | 2 | 2 | 2 | 2 |
| Agerite Resin D [1] | 1 | 1 | 1 | 1 |
| Paraflux [1] | 5 | 5 | 5 | 5 |
| Staybelite Resin [1] | 2.5 | 2.5 | 2.5 | 2.5 |
| Sulfur | 2.5 | 2.5 | 2.5 | 2.5 |
| Santocure [1] | 0.95 | 1.25 | 0.80 | 0.70 |
| A-32 [1] | 0.19 | 0.25 | 0.16 | 0.14 |

[1] As in Example II.

The stocks were milled, cured 30 minutes at 307° F., and physical properties determined. The following results were obtained:

| Description | 212 F. Compression Set, percent | 80 F. | | | 200 F. Maximum Tensile, p.s.i. | ΔT, F. | Resilience, percent | Flex Life, M | Shore Hardness | Tear Resistance, 80 F., lb./in. | Compounded MS 1½ at 212 F. |
|---|---|---|---|---|---|---|---|---|---|---|---|
| | | 300% Modulus, p.s.i. | Tensile, p.s.i. | Elongation, percent | | | | | | | |
| Butadiene/styrene | 15.3 | 930 | 3,700 | 590 | 840 | 36.5 | 70.2 | 18.8 | 50 | 165 | 20 |
| Butadiene/α-methyl-styrene | 13.8 | 900 | 3,820 | 590 | 740 | 37.1 | 68.1 | 16.8 | 52 | 155 | 18.5 |
| Butadiene/2-phenyl-4-acetoxy-1-butene | 16.4 | 630 | 3,600 | 660 | 800 | 37.1 | 69.6 | 14.3 | 46 | 235 | 17 |
| Butadiene/2-phenyl-4-hydroxy-1-butene | 13.5 | 880 | 4,230 | 600 | 600 | 38.5 | 61.2 | 27.2 | 51 | 235 | 20.5 |
| OVEN AGED 24 HOURS AT 212 F. | | | | | | | | | | | |
| Butadiene/styrene | | 1,500 | 3,600 | 500 | | 32.7 | 71.6 | 7.9 | 54.5 | | |
| Butadiene/α-methylstyrene | | 2,090 | 3,680 | 460 | | 37.1 | 71.0 | 4.5 | 56 | | |
| Butadiene/2-phenyl-4-acetoxy-1-butene | | 1,180 | 2,970 | 500 | | 35.1 | 72.2 | 4.8 | 50 | | |
| Butadiene/2-phenyl-4-hydroxy-1-butene | | 1,730 | 4,080 | 470 | | 37.1 | 59.5 | 7.7 | 55.5 | | |

*Example XV*

2-phenyl-4-lauryloxy-1-butene was prepared by the reaction of lauroyl chloride with 2-phenyl-4-hydroxy-1-butene in pyridine. The product was an amber liquid which crystallized slightly below room temperature. Recrystallization from ethyl alcohol gave a nearly white product. The product had the following properties:

Refractive index $n_D^{20}$ 1.4948; density $d_{20}^{20}$ 0.9441; molar refractivity $M_R$ 102.05; bromine number 48; purity by saponification 100 percent.

A copolymer of butadiene and 2-phenyl-4-lauryloxy-1-butene was prepared by emulsion polymerization at 41° F. in accordance with the following recipe:

| | Parts by weight |
|---|---|
| Butadiene | 75 |
| 2-phenyl-4-lauryloxy-1-butene | 25 |
| Water | 155 |
| Methanol | 25 |
| Potassium fatty acid soap | 5 |
| Tert-dodecyl mercaptan | 0.28 |
| Cumene hydroperoxide | 0.101 |
| $FeSO_4 \cdot 7H_2O$ | 0.167 |
| $K_4P_2O_7$ | 0.198 |
| KCl | 0.50 |

A conversion of 60.6 percent was reached in 15.9 hours. The reaction was shortstopped with 0.20 part di-tert-butylhydroquinone and 2 parts phenyl-beta-naphthylamine was added as the antioxidant. Coagulation was effected by the salt-alcohol method. The polymer had a Mooney value (ML-4) of 41.

The butadiene/2-phenyl-4-lauryloxy-1-butene copolymer was compounded according to the following tread formulation:

| | Parts by weight |
|---|---|
| Copolymer | 100 |
| Carbon black (Philblack O) | 50 |
| Zinc oxide | 3 |
| Stearic acid | 2 |
| Flexamine [1] | 1 |
| Circo-Para [2] | 5 |
| Sulfur | 1.75 |
| Santocure [3] | 0.95 |

[1] A physical mixture containing 65 percent of a complex diarylamine-ketone reaction product and 35 percent of N,N'-diphenyl-p-phenylenediamine.
[2] A blend of equal parts of Circosol-2XH with Paraflux Circosol-2XH: A petroleum hydrocarbon softener, containing hydrocarbons of high molecular weight, in the form of a heavy, viscous, transparent, pale green, odorless liquid of low volatility; specific gravity 0.940; Saybolt Universal viscosity at 100° F., about 2000 seconds. Paraflux: Saturated polymerized hydrocarbon.
[3] N-cyclohexyl-2-benzothiazolesulfenamide.

The compounded stocks were cured 30 minutes at 307° F. and physical properties determined. The following results were obtained:

Unaged samples:
 Compression set, percent _____ 17.3
 300% modulus, p.s.i. _____ 1430
 Tensile, p.s.i. _____ 1910
 Elongation, percent _____ 360
 200° F. maximum tensile, p.s.i. _____ 1040
 ΔT °F _____ 58.5
 Resilience, percent _____ 64.7
 Abrasion loss, grams (35 minutes' cure time)_ 1.98
 Extrusion at 250° F., in./min _____ 20.8
 Extrusion at 250° F., g./min _____ 50.5
 Compounded MS-1½ _____ 37

Oven aged 24 hours at 212° F.:
 300% modulus, p.s.i. _____ 1770
 Tensile, p.s.i. _____ 1770
 Elongation, percent _____ 300
 ΔT °F _____ 54.1
 Resilience, percent _____ 69.3
 Abrasion loss, grams (35 minutes' cure time)_ 2.73

The butadiene/2-phenyl-4-lauryloxy-1-butene copolymer was also evaluated in a carcass recipe using the following formulation:

| | Parts by weight |
|---|---|
| Copolymer | 100 |
| Carbon black (Philblack O) | 25 |
| Zinc oxide | 3 |
| Stearic acid | 2 |
| Agerite resin D [1] | 1 |
| Paraflux [2] | 5 |
| Staybelite resin [3] | 2.5 |
| Sulfur | 2.5 |
| Santocure [2] | 0.95 |
| A-32 [4] | 0.19 |

[1] Polymerized trimethyldihydroquinoline.
[2] As defined above.
[3] Hydrogenated rosin.
[4] Reaction product of butyraldehyde and butylidene aniline.

The compounded stocks were cured 30 minutes at 307° F. and physical properties determined. The following results were obtained:

Unaged samples:
 Compression set, percent _____ 13.0
 300 modulus, p.s.i. _____ 820
 Tensile, p.s.i. _____ 1000
 Elongation, percent _____ 320
 200° F. maximum tensile, p.s.i. _____ 360
 ΔT °F. _____ 27.4
 Resilience, percent _____ 78.1
 Shore hardness _____ 44
 Compounded MS-1½ at 212° F _____ 24
 TR freeze point, °C _____ −50

Oven aged 24 hours at 212° F.:
- Tensile, p. s. i. _____ 830
- Elongation, percent_____ 260
- ΔT °F. _____ 24.0
- Resilience, percent_____ 80.8
- Shore hardness_____ 48

*Example XVI*

A butadiene/acrylonitrile/2-phenyl-4-hydroxy-1-butene terpolymer was prepared by emulsion polymerization at 41° F. in accordance with the following recipe:

| | Parts by weight |
|---|---|
| Butadiene | 70 |
| Acrylonitrile | 10 |
| 2-phenyl-4-hydroxy-1-butene | 20 |
| Water | 180 |
| Potassium fatty acid soap | 5 |
| Tert-dodecyl mercaptan | 0.2 |
| Diisopropylbenzene hydroperoxide | 0.086 |
| $FeSO_4.7H_2O$ | 0.111 |
| $K_4P_2O_7$ | 0.132 |
| KCl | 0.5 |

A conversion of 59 percent was reached in 21.2 hours. The reaction was shortstopped with 0.2 part di-tert-butylhydroquinone and 2.0 parts phenyl-beta-naphthylamine was added as the antioxidant. Coagulation was effected by the salt-alcohol method. The polymer had a Mooney value (ML–4) of 41.5.

The terpolymer was compounded according to the tread formulation given in Example XV except that 0.6 part Santocure was used instead of 0.95 part. The compounded stocks were cured 30 minutes at 307° F. and physical properties determined. The following results were obtained:

Unaged samples:
- Compression set, percent_____ 11.1
- 300% modulus, p. s. i._____ 1975
- Tensile, p. s. i._____ 3640
- Elongation, percent_____ 495
- 200° F. maximum tensile, p. s. i._____ 1970
- Green tensile_____ Good
- ΔT °F_____ 69.9
- Resilience, percent_____ 61.8
- Abrasion loss, grams (35 minutes' cure time)__ 3.09
- Extrusion at 250° F. in./min._____ 35.2
- Extrusion at 250° F. g./min._____ 75.5
- Compounded MS–1½_____ 47

Oven aged 24 hours at 212° F.:
- 300% modulus, p. s. i._____ 3360
- Tensile, p. s. i._____ 3580
- Elongation, percent_____ 320
- ΔT °F_____ 56.8
- Resilience, percent_____ 66.4
- Abrasion loss, grams (35 minutes' cure time)__ 2.93

The terpolymer was also evaluated in a carcass recipe using the formulation given in Example XV except that 0.6 part Santocure was used instead of 0.95 part and 0.12 part A–32 was used instead of 0.19 part. The compounded stocks were cured 30 minutes at 307° F. and physical properties determined. The following results were obtained:

Unaged samples:
- Compression set, percent_____ 10.9
- 300% modulus, p. s. i._____ 890
- Tensile, p. s. i._____ 3110
- Elongation, percent_____ 550
- 200° F. maximum tensile, p. s. i._____ 200
- ΔT °F_____ 37.1
- Resilience, percent_____ 72.1
- Flex life, thousands of flexures to failure___ 3.8
- Shore hardness_____ 51
- Compounded MS–1½ at 212° F_____ 25.5
- TR freeze point, °C_____ –27

Oven aged 24 hours at 212° F.:
- 300% modulus, p. s. i._____ 1425
- Tensile, p. s. i._____ 2715
- Elongation, percent_____ 430
- ΔT °F_____ 32.1
- Resilience, percent_____ 75.5
- Shore hardness_____ 56

*Example XVII*

2-phenyl-4-(N,N-dimethylaminoacetoxy)-1-butene, was prepared by the reaction of 2-phenyl-4-chloroacetoxy-1-butene and dimethylamine. The product had the following properties:

Boiling point, 130–133° C. at 1.4 mm. Hg; refractive index, $n_D^{20}$ 1.5210; density, $d_{20}^{20}$ 1.0306; molar refractivity, $M_R$ 69.3; bromine number, 67. Analysis of the material gave a nitrogen content of 5.85 percent.

A copolymer of butadiene and 2-phenyl-4-(N,N-dimethylaminoacetoxy)-1-butene, was prepared by emulsion polymerization at 41° F. in accordance with the following recipe:

| | Parts by weight |
|---|---|
| Butadiene | 75 |
| 2 - phenyl - 4 - (N,N-dimethylaminoacetoxy)-1-butene | 25 |
| Water | 155 |
| Methanol | 25 |
| Potassium fatty acid soap | 5 |
| Tert-dodecyl mercaptan | 0.20 |
| Diisopropylbenzene hydroperoxide | 0.194 |
| $FeSO_4.7H_2O$ | 0.278 |
| $K_4P_2O_7$ | 0.330 |
| KCl | 0.50 |

A conversion of 58 percent was reached in 21.1 hours. The reaction was shortstopped with 0.20 part di-tert-butylhydraquinone (based on monomers charged). Two parts phenyl-beta-naphthylamine (based on 100 parts rubber) was added as the antioxidant. Coagulation was effected by the salt-alcohol method. The polymer had a Mooney value (ML–4) of 40.

The butadiene/2-phenyl-4-dimethylaminoacetoxy-1-butene was compounded according to the following tread formula:

| | Parts by weight |
|---|---|
| Copolymer | 100 |
| Carbon black (Philblack O) | 50 |
| Zinc oxide | 3 |
| Stearic acid | 2 |
| Flexamine [1] | 1 |
| Circo-Para [1] | 5 |
| Sulfur | 1.75 |
| Santocure [1] | 0.7 |

[1] As in Example XV.

The compounded stocks were cured 30 minutes at 307° F. and physical properties determined. The following results were obtained:

Unaged samples:
- Compression set, percent_____ 13.1
- 300% modulus, p. s. i._____ 1190
- Tensile, p. s. i._____ 2685
- Elongation, percent_____ 510
- 200° F. maximum tensile, p. s. i._____ 1340
- ΔT °F_____ 80.1
- Resilience, percent_____ 59.3
- Abrasion loss, grams (35 min. cure time)___ 5.39
- Extrusion at 250° F., in./min._____ 35.5
- Extrusion at 250° F., g./min._____ 77
- Compounded MS–1½_____ 37

Oven aged 24 hours at 212° F.:
- 300% modulus, p. s. i._____ 2230
- Tensile, p. s. i._____ 2865
- Elongation, percent_____ 370
- ΔT °F_____ 68.3
- Resilience, percent_____ 66.2
- Abrasion loss, grams (35 min. cure time)___ 4.40

As many possible embodiments may be made of this invention without departing from the scope thereof, it is to be understood that all matter herein set forth is to be interpreted as illustrative and not in a limiting sense.

We claim:

1. As a new composition of matter, a copolymer of a compound of the formula

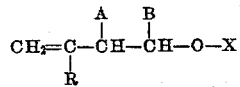

where R is an aryl radical, A and B are selected from the group consisting of H, methyl and ethyl radicals, and X is selected from the group consisting of (1)     $-H, -R'$ and

where R' is selected from the group consisting of saturated aliphatic radicals, and substituted saturated aliphatic radicals; and (2)     $-R'', -\overset{O}{\underset{\|}{C}}-R'', -(CH_2CH_2O)_nH$ and $-(CH_2CH_2NH)_nH$ where R'' is selected from the group consisting of radicals having aliphatic unsaturation and $n$ is an integer from 1 to 16 and a conjugated diene.

2. The composition of claim 1 in which said conjugated diene is butadiene.

3. A vulcanized polymer of claim 1 in which there is incorporated a reinforcing agent is selected from the group consisting of carbon black and silica.

4. The composition of claim 1 in which said conjugated diene is isoprene.

5. As a new composition of matter, a copolymer of 2-phenyl-4-acetoxy-1-butene and a conjugated diene.

6. As a new composition of matter, a copolymer of 2-phenyl-4-hydroxy-1-butene and a conjugated diene.

7. As a new composition of matter, a copolymer of 2-phenyl-4-acetoxy-1-butene and butadiene.

8. As a new composition of matter, a copolymer of 2-phenyl-4-hydroxy-1-butene and butadiene.

9. As a new composition of matter, a copolymer of 2-phenyl-4-acetoxy-1-butene and isoprene.

10. As a new composition of matter, a copolymer of 2-phenyl-4-lauryloxy-1-butene and butadiene.

11. As a new composition of matter, a terpolymer of 2-phenyl-4-acetoxy-1-butene, butadiene, and styrene.

12. As a new composition of matter, a terpolymer of 2-phenyl-4-hydroxy-1-butene, butadiene and styrene.

13. As a new composition of matter, a copolymer of 2-phenyl-4-capryloxy-1-butene and butadiene.

14. As a new composition of matter, a copolymer of 2-phenyl-4-monochloroacetoxy-1-butene and butadiene.

15. A rubbery copolymer comprising 40 to 85 parts by weight of a conjugated diene and 60 to 15 parts by weight of a compound of the formula

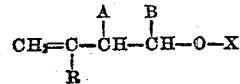

where R is an aryl radical, A and B are selected from the group consisting of H, methyl and ethyl radicals, and X is selected from the group consisting of $-H, -R'$ and

where R' is selected from the group consisting of saturated aliphatic radicals, and substituted saturated aliphatic radicals; and

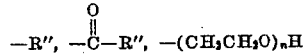

and

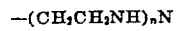

where R'' is selected from the group consisting of radicals having aliphatic unsaturation and $n$ is an integer from 1 to 16.

16. A vulcanized polymer of claim 15 in which there is incorporated a reinforcing agent is selected from the group consisting of carbon black and silica.

17. In the method of preparing a copolymer by aqueous emulsion polymerization of a conjugated diene and a compound of the formula

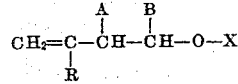

where R is an aryl radical, A and B are selected from the group consisting of H, methyl and ethyl radicals, and X is selected from the group consisting of (1)     $-H, -R'$ and $-\overset{O}{\underset{\|}{C}}-R'$ where R' is selected from the group consisting of saturated aliphatic radicals, and substituted saturated aliphatic radicals; and (2)     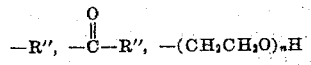

and

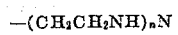

where R'' is selected from the group consisting of radicals having aliphatic unsaturation and $n$ is an integer from 1 to 16, the improvement which comprises adding a water-soluble diluent to said aqueous emulsion.

18. In the polymerization of butadiene and 2-phenyl-4-lauryloxy-1-butene in aqueous emulsion, the improvement which comprises adding methanol as a water-soluble diluent to said emulsion.

19. In the polymerization of butadiene and 2-phenyl-4-(N,N-dimethylaminoacetoxy)-1-butene by emulsion polymerization, the improvement which comprises adding methanol as a water-soluble diluent to said emulsion.

References Cited in the file of this patent

Price et al.: Jour. Am. Chem. Soc. 71, 2860-2 (1949).